Aug. 14, 1945.  J. DUSEVOIR  2,382,006
INTERNAL-COMBUSTION ENGINE
Filed April 27, 1942  2 Sheets-Sheet 1
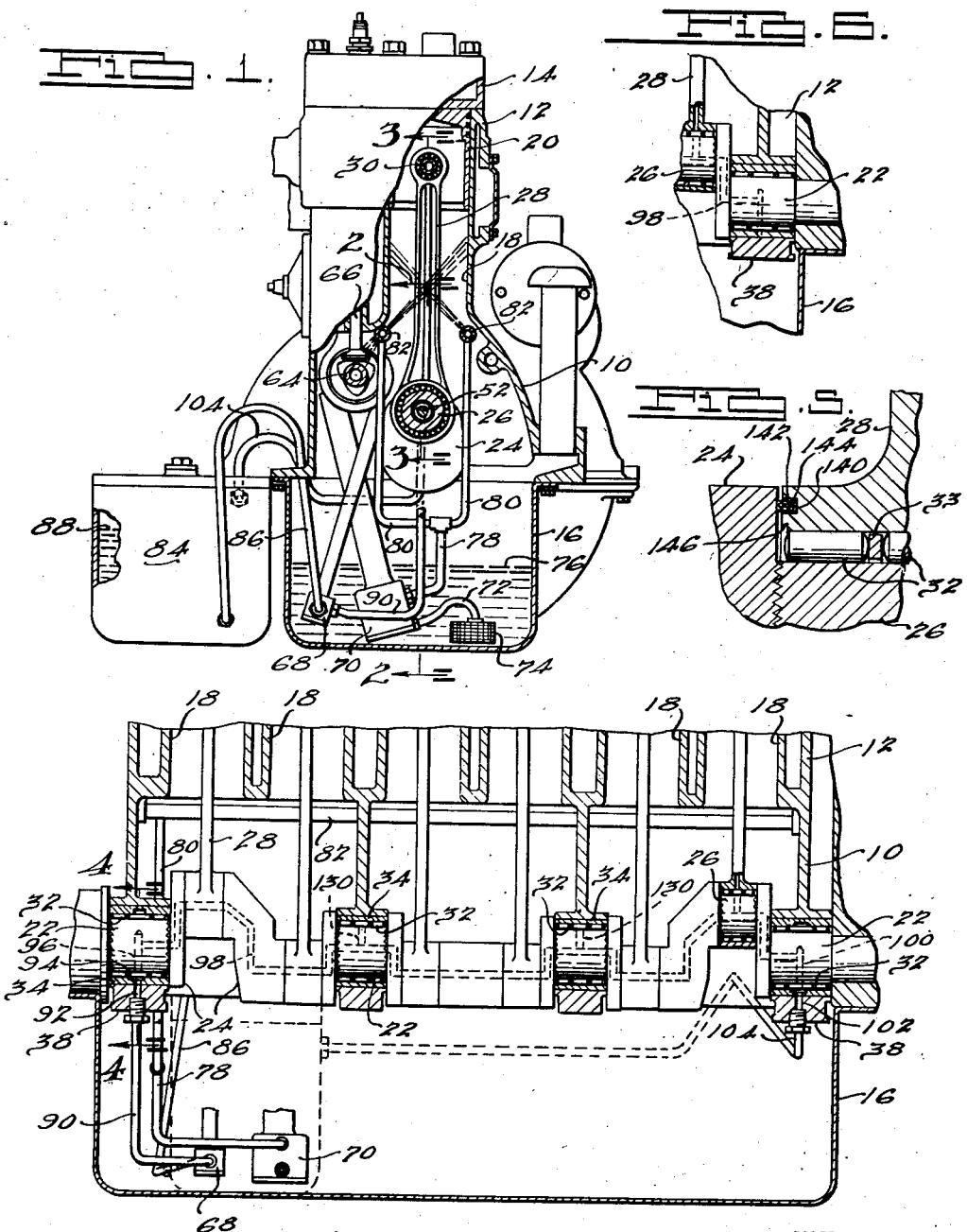
INVENTOR
Julius Dusevoir.
BY
Harness, Dickey & Pierce.
ATTORNEYS.

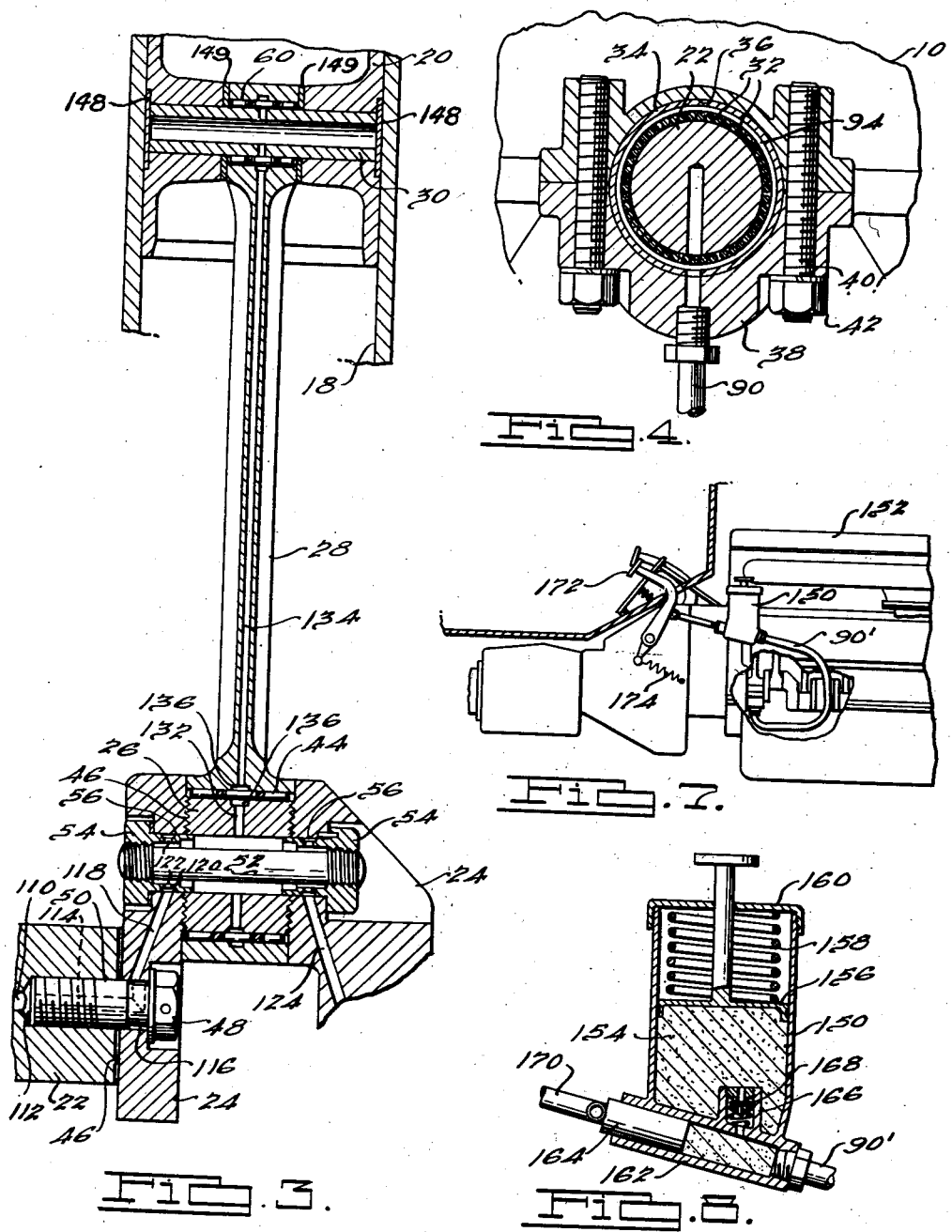

Patented Aug. 14, 1945

2,382,006

UNITED STATES PATENT OFFICE 2,382,006

INTERNAL-COMBUSTION ENGINE

Julius Dusevoir, Dearborn, Mich., assignor to Century Motors Corporation, Dearborn, Mich., a corporation of Michigan Application April 27, 1942, Serial No. 440,647

9 Claims. (Cl. 184—6)

This invention relates to internal combustion engines and particularly to a means for lubricating the working parts thereof, the principal object being the provision of a new and novel lubrication system for internal combustion engines that will be effective in increasing the normal life of such engines in service.

Objects of the invention include the provision of an internal combustion engine and a lubrication system therefor in which the lubricant for the crankshaft bearings is prevented from comingling with the lubricant employed for bathing the cylinder walls of the engine; the provision in an internal combustion engine of a lubricating system therefor in which the bearings for the main journal and the crank pins of the crankshaft are sealed against excessive loss of lubricant therefrom and are supplied by lubricant separate from the supply of lubricant provided for lubricating the cylinder walls and other parts of the engine, whereby any foreign material which may be picked up by the latter lubricant is prevented from coming in contact with the bearing surfaces of the crankshaft; the provision of an internal combustion engine and means for lubricating the working parts thereof so constructed and arranged that clean or unused oil only is employed for lubricating the crankshaft bearings; and the provision of an internal combustion engine and means for lubricating the working parts thereof in which the lubricant for the crankshaft bearings is sealed from agitation with air, thus materially reducing the oxidizing effects of air on such lubricant.

Other objects of the invention include the provision of an internal combustion engine and a pair of separate lubricating systems therefor with each system provided with its own lubricant supply, one of the systems being employed primarily for the lubrication of the bearings for the crankshaft and the other of the systems being primarily employed for the lubrication of other wearing surfaces of the engine; the provision of an internal combustion engine having a pair of independently operated lubricant supply means, one of the supply means being arranged to deliver lubricant primarily to the bearings for the crankshaft of the engine and the other supply means being primarily adapted to deliver lubricant to the cylinder walls and other parts of the engine; the provision of an internal combustion engine having a pair of separate lubricant circulatory systems substantially sealed from one another, each of the systems having an independent source of supply and one of the systems being primarily adapted to effect lubrication of the bearings for the crankshaft and the other of the systems being primarily adapted to effect lubrication of the other parts and also serve as a coolant; the provision of an engine lubricating system as above described in which leakage of lubricant from the first mentioned system acts to increase the volume of lubricant in the second mentioned system by the amount of such leakage; and the provision of an internal combustion engine having a pair of independently operated lubricating systems, one of which employs a grease as a lubricant and is associated with the crank-shaft and associated bearings while the other system comprises a lubricating circulatory system arranged for lubrication of the cylinder walls of the engine and associated parts, as well as acting as a coolant therefor.

The above being among the objects of the present invention the same consists in certain novel features of construction and combination of parts to be hereinafter described with reference to the accompanying drawings, and then claimed, having the above and other objects in view.

In the accompanying drawings which illustrate suitable embodiments of the present invention and in which like numerals refer to like parts throughout the several different views.

Fig. 1 is a partially broken, partially sectioned end elevational view of an internal combustion engine equipped with my improved oiling system, the section being taken in a vertical plane transversely of the length of the engine;

Fig. 2 is a slightly enlarged fragmentary, vertical sectional view taken longitudinally of the engine shown in Fig. 1 on the axis of the crankshaft thereof;

Fig. 3 is an enlarged fragmentary, vertical sectional view taken through a portion of the crankshaft, one of the connecting rods and associated piston and cylinder of the engine shown in the preceding views and illustrating the oil passages therein with greater clarity;

Fig. 4 is an enlarged fragmentary, vertical sectional view through one of the end journals of the crankshaft of the engine shown in the preceding views as on the line 4—4 of Fig. 2;

Fig. 5 is an enlarged fragmentary sectional view taken through the axis of one of the crank pins of the engine shown in the preceding views and illustrating a form of sealing means capable of being employed between the associated connecting rod and associated crank throw;

Fig. 6 is a fragmentary, partially broken vertical sectional view of a modified form of construction for use with the righthand end journal of the crankshaft shown in Fig. 2;

Fig. 7 is a more or less diagrammatic, fragmentary side elevational view of an automobile provided with an engine having a lubricating system constructed in accordance with the present invention but in which the lubricant supplied to the crankshaft may be of a grease-like character; and, Fig. 8 is an enlarged, vertical sectional view taken centrally through the grease reservoir and pumping means of the construction illustrated in Fig. 7.

It is conventional practice in connection with internal combustion engines to provide a lubricant circulating system which draws lubricant from a source of supply such as the oil pan of the engine and delivers it under pressure or otherwise to all or substantially all of the wearing surfaces of the engine and from such wearing surfaces such oil that is not lost drains back or is pumped back to the source of supply for redistribution to the wearing surfaces. Accordingly, all of the wearing surfaces of the engine are lubricated by the same lubricant which is used over and over again and lubricant which may, at one moment, have been used for lubricating one wearing surface may, during the next moment, be used for lubricating an entirely different part.

In my investigation of the reasons for the crankshaft and connecting rod bearing failure of internal combustion engines I have come to the conclusion that the majority of such failures are due entirely to the presence of foreign material in the lubricant for these bearings. In other words, I have found that if these bearings are properly constructed and fitted and furnished with clean lubricant and are not overloaded to an unconscionable degree substantially no wear of these bearings and their associated journals will occur and the bearings will stand up almost indefinitely.

Means are, of course, provided in connection with nearly all modern internal combustion engines for removing foreign material from the lubricating oil therefor. The greatest majority of these engines close the bottom of the crankcase by a so-called oil pan which serves as a reservoir for the lubricating oil for the engine. The intake pipe or tube for the oil pump terminates in the bottom of the oil pan and is conventionally surrounded by a screen of fine wire mesh through which all of the oil circulated through the lubricating system is passed. While such screens do prevent the entrance of relatively large particles of foreign material into the lubricating system it is, of course, generally recognized that the finer particles of foreign material are not separated out thereby but pass through the screen and consequently are entrained in the lubricant oil which is circulated to the various bearings and other working parts of the engine.

Most modern automobile engines are provided with an additional filter the intended purpose of which is to remove the fine particles of foreign material from the lubricant being circulated through the system. However, because of the inherent nature of any filter capable of removing such fine particles of foreign material from the lubricating oil it is impractical, both from the standpoint of cost and bulk, to provide such a filter of a size sufficient to continuously filter all of the lubricant which is circulated through the lubrication system of such a conventionally lubricated engine. As a result, only a portion, usually in the neighborhood of ten per cent, of the total oil being circulated through the lubricating system of such engine, is passed through such filter, with the expectations that eventually all portions of the oil being circulated will pass through the filter and the foreign material carried thereby removed.

It will be appreciated that, although all of the particles of foreign material carried by the ten per cent of the lubricating oil which passes through the filter may be removed, any such particles of foreign material being carried by the remaining ninety per cent of the oil are thus necessarily carried by the oil to the bearings lubricated thereby and to the various wearing surfaces to which the oil is supplied. Such particles of foreign material, particularly where they comprise particles of carbon which have been built up and dislodged from the underside of the piston heads, for instance, particles of scale from the interior surfaces of the crankcase, particles of metal worn from the working parts, or particles of molding sand which may have adhered thereto, are of extremely abrasive character. Accordingly, where such particles of foreign material are fed with the oil to a plain type of bearing, and particularly when these are the bearings for the crankshaft and connecting rods and are faced with babbitt of relatively soft character, at least some of such particles eventually become imbedded in the babbitt and generally are partially exposed upon the surface thereof, the ultimate result being that eventually the bearings, instead of constituting an anti-friction surface, become an abrasive element which continues to wear away the surface of the journals rotating therein.

The effect of such particles of foreign material upon bearings of the rolling anti-friction type, and which may be either ball bearings or roller bearings, is even more marked than in plain types of bearings. When a particle of such hard foreign material works its way between such rolling anti-friction elements and a race therefor, because of the fact that generally no clearance is provided between such elements and their races and in some types of bearings the fit is such as to actually pre-load the rolling anti-friction elements, a particle of hard material, in passing between these surfaces, necessarily breaks down a small fraction of such surface. Such effect may, of course, occur at a multitude of points over the surfaces of the rolling anti-friction elements and their races. The consequent effect is then the same as when a hole develops in the surface of a roadway in which it is readily recognized that the continual passage of wheels over such hole serves to break away the edges thereof and rapidly increase its size. Through this type of action the surfaces' rolling anti-friction elements and their races are quickly destroyed with consequent destruction of the entire bearing.

Another reason for failure of conventional oiling systems is that the lubricant is sprayed, splashed or otherwise intimately mixed with the hot air in the crankcase of the engine, and comes into direct contact with highly heated parts thereof, as for instance the pistons, and is partially oxidized or broken down thereby. This has been found to be extremely detrimental to the continued proper functioning of the lubricant and particularly where employed for the relatively heavily loaded bearing surfaces such as the crankshaft and connecting rod bearings.

With the above in view I have come to the conclusion that, inasmuch as substantially if not entirely all of such foreign material found in the lubricating oil of internal combustion engines is picked up from the interior walls of the pistons and the crankcase of such engine, if the bearings for the crankshaft and connecting rods of such engines are to have the desired length of life they must be lubricated by a lubricant which does not and has not come in contact with the interior walls of the crankcase or other parts. This, of course, can only be accomplished by providing one lubricating system for the bearings of the crankshaft and connecting rods and an entirely different and separate system for the cylinder walls and those surfaces such as the rubbing surfaces between the cams and their tappets exposed on the interior of the crankcase. In this connection it will be appreciated that as long as such bearings are provided with an ample supply of clean lubricant devoid of foreign material of the character referred to, it is not necessary that a continuously circulating lubricating system be provided for such bearings. Such a continuously circulating system may be desirable from the standpoint of abstracting heat from such bearings and thereby aid in maintaining their temperatures below a safe operating temperature, but in this connection it will be appreciated that because of the fact that such bearings and their cooperating parts will be continually externally bathed by the lubricant contained within the crankcase and employed for lubricating the wearing surfaces therein, the latter lubricant will usually be ample to abstract such heat and maintain the bearings at a sufficiently low temperature for all practical purposes.

From the above it will be appreciated that in accordance with the present invention one lubricating system is provided primarily for the bearings of the crankshaft and connecting rods of an internal combustion engine and a separate lubricating system is provided for those wearing parts of the engine exposed to the interior of the crankcase. It may be impractical if not impossible to completely seal the former lubricating system from the latter and it may be assumed that some leakage of lubricant will always occur from around the bearings for the crankshaft and connecting rods into the interior of the crankcase. Ordinarily there will be no disadvantage to such leakage in view of the fact that in most cases the type of lubricant employed for lubricating the crankshaft and connecting rod bearings will be identical to or substantially the same as that employed for lubricating the wearing surfaces exposed to the interior of the crankcase, and particularly where the first lubricating system is properly designed such leakage may not be in excess of the natural losses of lubricant from the second system and thereby serve to maintain the second system with the required volume of lubricant therein. Thus, in such case, instead of adding lubricant to the crankcase of the engine from time to time to maintain the level of oil therein as in conventional practice, the oil in the present case may be added to the supply or reservoir for the first system. Even where a solid lubricant is employed for the system furnishing the crankshaft and connecting rod bearings and particularly in which case delivery of the lubricant, rather than circulation thereof, is effected by the first system, the small amount of leakage of such solid lubricant into the lubricating oil in the crankcase will have no appreciable ill effects in the lubrication of the wearing surfaces supplied by the second system. The use of solid lubricant may be particularly desirable where the bearings for the crankshaft and/or connecting rods are of the rolling anti-friction type.

An important feature to note in connection with the present invention is that it has been found that an extremely small amount of lubricant only is needed to amply lubricate the crankshaft bearings by the present invention, apparently as a result of the use of clean oil only for this purpose, and in view of the fact that the exterior surfaces of the journal and connecting rod bearings are cooled by contact with the other lubricant thrown around in the crankcase. It therefore makes it readily possible, if desired, to effectively filter all of the oil fed to the crankshaft bearings in practicing the present invention by means of a filter of unusually small size as compared to the filters employed in engines having conventional lubricating systems. For the same reasons, the lubricant reservoir for the lubricant fed to the crankshaft bearings may be of unusually small size.

Another important feature is that, because the lubricant for the crankshaft bearings if not recirculated, and even if recirculated, is never directly exposed to or mixed with the hot air in the crankcase of the engine or ever comes into contact with unusually hot operating parts such as pistons, and at the most is exposed only to the relatively small amount of comparatively cool air in its own reservoir where substantially no agitation of either the air or lubricant occurs, substantially no oxidization of this lubricant occurs and the deleterious effects thereof on such lubricant is therefore substantially entirely eliminated.

In the foregoing, mention has been made only of those types of engines in which a conventional oil pan closes the lower face of the crankcase and serves as an oil reservoir. It will be appreciated, of course, by those skilled in the art that the invention is equally applicable to those types of internal combustion engines which employ what is known as a dry sump type of lubrication and in which the crankcase does not serve as an oil reservoir but in which the lubricating oil finding its way into the crankcase is drained or pumped therefrom to a separate reservoir from which it is again distributed to the various wearing surfaces of the engine. Only the former type of engine is shown in the drawings by way of illustration and the application of the present invention to the last-mentioned type of engine will be appreciated by those skilled in the art without further explanation. It will also be appreciated that the particular constructional features of the engine to which the present invention is adapted are unimportant as long as the essential features of the present invention are embodied therein, and that the constructional features of the engine shown are illustrative only and are not limiting in character.

Referring to the accompanying drawings and particularly to Figs. 1 and 2, it will be noted that the engine comprises a crankcase 10 having a conventional type of cylinder block 12 cast integrally therewith and provided with a removable cylinder head 14. The bottom of the crankcase 10 is closed by a conventional type of oil pan 16. As indicated in Fig. 2, the cylinder block 12 is formed to provide a plurality, six in the particular case shown, of cylinders 18 in each of which a piston 20 is reciprocably received. Within the crankcase 10 a crankshaft is rotatably mounted and such crankshaft comprises main journal portions 22, throw portions 24 and crank pins 26 and each crank pin 26 is connected to its corresponding piston 20 by means of a connecting rod 28 and associated wrist pin 30. While any suitable or conventional type of bearing may be employed between the main journal portions 22 of the crankshaft and the crankcase 10 and between the big end of the connecting rods 28 and the crank pin portions 26, as a matter of illustration in the present case these bearings are illustrated as of the roller type. Accordingly, and as best brought out in Figs. 2 and 4, the main journal portions 22 are each surrounded by a multiplicity of bearing rollers 32 lying in direct contact therewith and which rollers are surrounded by a hardened sleeve 34 within which they run. The rollers 32 as shown are preferably relatively short, in the particular case shown requiring three of them in end to end relation to equal the length of the bearing, and each row of rollers is separated from the adjacent row in the same bearing by a spacer or washer 33 as best brought out in Fig. 5. The use of such short rollers is preferable in a rotating bearing to eliminate possible cocking of the rollers.

As best brought out in Fig. 4 the sleeves 34 are each received in a corresponding semi-circular seat 36 formed in the crankcase 10 and are secured in position against such seat by means of caps 38 secured in place by means of studs 40 and nuts 42. As in the case of the main journals 22 any conventional or suitable type of bearing may be employed between the big end of each connecting rod 28 and the corresponding crank pin 26 of the crankshaft. However, in the present case by way of illustration the big ends of the connecting rods 28 are solid, that is, unsplit, and a multiplicity of rollers 44, of the same general character as the rollers 32, surround each crank pin 26 and in turn are surrounded by such big end of the connecting rod. In case the connecting rods are made from a hardenable steel then the rollers 44 may directly contact the surface of the crank pins 26 and the walls of the bores in the big ends of the connecting rods 28, otherwise a bearing sleeve equivalent to the sleeve 34 employed in connection with the main journals 22 will necessarily be provided as a liner for the big end of the connecting rod for the rollers 44 to roll against.

It will be appreciated that by employing the types of bearing above described and particularly where employing connecting rods having unsplit big ends as shown it is necessary to employ a built-up type of crankshaft in order to permit assembly of the bearings to and disassembly of the bearings from the crankshaft and connecting rods. While in the broader aspects of the invention any suitable type of built-up crankshaft may be employed for this purpose, the crankshaft preferably employed is that shown and described in my United States Letters Patent No. 2,013,039, issued to me on September 3, 1935, for improvements in Engine crankshaft, or of the type shown and described in my co-pending application for Letters Patent of the United States for improvements in Crankshaft, serially numbered 404,756 and filed July 31, 1941. This latter type of construction is that preferred and its structural features are brought out in Fig. 3 from which it will be appreciated that the main journals 22 are formed separately from the throws 24 and the throws 24 are formed separately from the crank pins 26 and after forming they are all assembled together in a unitary structure.

These various formed parts are arranged with abutting surfaces disposed in planes perpendicular to the axis of rotation of the crankshaft and the abutting faces of each cooperating pair of parts are provided with curved serrations 46, which intermesh with each other when the parts are in assembled relationship. These serrations 46 on each such abutting surface are preferably struck from the center located outside of the periphery of the abutting surface so that the two parts may be assembled together only in one position of relative rotation and the interengaging curved serrations not only prevent relative turning movement between the two parts but also prevent lateral displacement of one of the parts with respect to its associated parts in any direction except along the length of the serrations which, being curved, offer a material amount of resistance to lateral displacement even in the general direction of the length thereof. In order to secure the throws 24 to the main journal 22 a machine screw such as 48 is projected axially through each throw 24 and threaded axially into its corresponding main journal portion 22 not only to maintain the throw against separation axially of the cooperating throw 22 but also locking it against lateral shifting movement in the direction of the serrations 46 between them. In such case the bolts 48 may each be provided with an unthreaded cylindrical portion 50 thereon which is closely received in the bore for the bolts 48 of each cooperating main journal 22 and throw 24 in overlapping relation with respect to the plane of abutment between the parts, this feature serving an additional purpose which will hereinafter be more fully described.

In order to secure each crank pin 26 between a cooperating pair of throws 24 these parts are provided with aligned openings arranged axially of the corresponding crank pin 26 as illustrated in Fig. 3 and in which such aligned openings a stud 52 is received. Nuts 54 received on opposite ends of each stud 52 cooperate with the corresponding throws 24 and stud 52 to clamp the crank pin 26 therebetween. Each nut 54 is provided with an axially inwardly extending collar portion 56 each of which is closely received in the corresponding aligned bores in the crank pin 26 and throws 24 to thus serve the same purpose as the portion 50 of the bolt 48 previously described. The studs 52 are reduced in diameter within the collar portions 56 to provide a space the purpose of which will be apparent later.

Although it will be appreciated that any suitable type of bearing may be employed between the small end of each connecting rod 28 and its associated piston pin 30, in the present case it is assumed that the connecting rod 28 is made from a hardened material and a multiplicity of rollers 60 are interposed between the bore at its small end and the surface of the corresponding piston pin 30.

The engine shown being of the four-cycle type, a cam shaft 64 suitably mounted in the crankcase 10 is provided in cooperative relationship with respect to tappets 66 for the purpose of operating the inlet and exhaust valves (not shown) and is itself driven from the crankshaft at half the speed thereof in a conventional manner and in accordance with conventional practice.

In accordance with the present invention and in the particular construction shown by way of illustration in Figs. 1 to 5, inclusive, two independent oil pumps 68 and 70 are positioned in the bottom of the oil pan 16 and are supported from the crankcase 10 and are driven from the cam shaft 64 in accordance with conventional practice. It will be understood that in the broader aspects of the invention the reservoirs or supplies of lubricant for each of these pumps may be located where desired. In the type of engine shown the oil pan 16 will usually be used as the reservoir for one system. The reservoir for the other system may be positioned in or outside such oil pan. In the case shown the pump 70 is provided with an intake pipe 72 which terminates in a filter element 74 positioned at the bottom of the oil pan 16. The filter element 74 is normally adapted to be submerged in a body of lubricant contained within the oil pan 16 and whose upper level is indicated at 76. For the purpose of convenience this body of lubricant will be referred to as the lubricant 76 in the following description. The pump 70 is provided with an outlet pipe 78 which is branched as at 80 and each branch extends upwardly on opposite sides of the engine to a point below the lower end of the cylinder bores 18 where each joins a longitudinally extending tube 82 which extends along the bottom ends of the cylinder bores 18 on each side of the engine. The tubes 82 are provided with openings therein through which the lubricant 76 discharged by the pump 70 is sprayed onto the walls of the cylinder bores 18, onto the rubbing surfaces between the cam shaft 64 and tappets 66, as indicated in Fig. 1, and to such other surfaces on the engine as may require this particular type of lubricant.

Mounted on the exterior of the crankcase 10 is an oil reservoir 84. The pump 68 which is shown as of substantially smaller size and capacity than the pump 70 is provided with an intake pipe 86 which extends up through the flange of the crankcase 10 and thence into the bottom of the reservoir 84. The reservoir 84 contains a body of lubricant the level of which is indicated at 88 in Fig. 1. This lubricant for the purpose of convenience in description will hereinafter be referred to as the lubricant 88.

The pump 68 is provided with a discharge pipe 90 which extends up to the cap 38 for one of the end crankshaft journals 22 to which it is connected so as to be in open communication with a passage 92 in such cap as best illustrated in Fig. 2. The passage 92 in such cap is aligned with a similar passage in the sleeve 34 of the bearing for such journal 22 and such sleeve is provided midway between its opposite ends with an internal groove 94 in open communication with the above mentioned passages and consequently in open communication with the discharge side of the pump 68. The particular journal 22 under consideration is provided with a radial passage 96 therein opening onto the surface of the journal 22 in the general plane of the groove 94 so as, therefore, to be in open communication with the groove 94 through the roller bearings 32. The passage 96 is in open communication with a series of passages, indicated in Figs. 1 and 2 at 98, which extend through the length of the crankshaft from the lefthand end journal 22 thereof as viewed in Fig. 2 to the righthand end journal 22 thereof and within the latter journal this series of passages 98 is in open communication with a radial passage 100 which communicates with a passage 102 in the cap 38 of the bearing for such journal in the same manner as the construction described at the opposite end of the engine. The passage 102 in the last-mentioned cap, at the righthand end of the engine as viewed in Fig. 2, is openly connected to a discharge tube or pipe 104 which passes up through the side flange of the crankcase 10, as indicated in Fig. 1, and discharges into the reservoir 84 adjacent the upper end thereof.

The series of passages 98 in the crankshaft may be formed in the general manner illustrated in Fig. 3 in which it will be noted that the journal 22 is centrally provided with an axial opening 110 therein the opposite ends of which lead into the larger openings 112 in the ends of the journal members 22 for threadable reception of the cooperating bolts 48. Each bolt 48 has a central opening 114 therein which extends from the threaded end of the bolt to a point short of the head of the bolt where the diameter of the bolt is reduced as at 116 to form an annular passage between it and the wall of the bore in the cooperating throw 24 provided for reception of the bolt. From the annular passage thus formed in the bore in the throw 24 by the reduced portion 116 of the bolt 48 a radial passage 118 is provided in the throw 24 and this passage 118 connects with an annular groove 120 in the collar portion 56 of the nut 54 of the same throw 24. Openings 122 in the collar portion 56 communicate the groove 120 with the space between the collar portion 56 and the stud 52. Oil may thus flow to the same space and along the stud 52 where it flows through openings and a groove in the corresponding collar portion 56 of the corresponding nut 52 to the passage 124 in the corresponding throw 24. The whole of the passage 98 is thus made up of partial passages such as illustrated in Fig. 3 and above described.

The passage 110 in each main journal portion 22 of the crankshaft intermediate the opposite end journals is, of course, in communication with a radial passage such as 130 (see Fig. 2) in such journal which leads to the exterior surface of such journal portion or member 22 for the purpose of lubricating the bearings surrounding the same and in which it is supported. As best brought out in Fig. 3 each crank pin 26 is provided with a radial passage 132 which is in open communication with oil flowing along the corresponding stud 52 so as to conduct lubricant from passage 122 to the bearing surrounding the pin 26. Additionally, the connecting rod 28 cooperating with each crank pin 26 is provided with a central longitudinal opening 134 which opens onto the bore of the big end thereof so as to enable lubricant to be carried therethrough to the bearing between it and its corresponding wrist pin 30. A peripheral groove 136 in each crank pin 26 aligned with the passage 132 therein and an opposed groove 138 in the bore of the big end of the connecting rod are preferably provided for facilitating the flow of lubricant from the passage 132 in each crank pin 26 to the passage 134 in the cooperating connecting rod 28.

In carrying out the present invention it is desirable that all bearings connected with the pump 68 be sealed against the excessive escape of lubricant into the oil pan 16 for the purpose of guarding against excessive use of lubricant. Any suitable type of sealing means for these bearings may, of course, be employed and it is to be understood that it is assumed that all of the bearings for the main journal 22 and all the bearings for the crank pins 26 of the crankshaft shown are so sealed. Such bearings are not indicated as being equipped with such seals in Figs. 1, 2 and 3 only for the purpose of simplicity in the drawings, but in Fig. 5 one type of seal is shown and all of the aforesaid bearings may be assumed to be equipped with such type of seal by way of illustration.

Referring to Fig. 5 which indicates such seal between the big end of the connecting rod and the opposed cheek of the cooperating throw 24, it will be noted that the width of the big end of the connecting rod 28 is such as to be relatively closely received between the cooperating throws 24, that is so as to leave a minimum amount of clearance between its ends and the throws 24. The outer end faces of the big end of the connecting rod 28 are annularly grooved as at 140. Within each groove is closely received, as by a light press fit, an annular ring 142. Each ring is formed from relatively thin sheet metal and is of channel section with the open side of the channel opening axially outwardly. Within the channel of each ring 42 is received a felt or the like ring 144 which projects outwardly therefrom and into sealing relation with respect to the opposed face of the associated crank throw 24. Preferably the end faces of the big end of the connecting rod 28, and the equivalent faces of the parts associated with other like bearings, are axially recessed radially inwardly of the corresponding groove 140 and the radially outer wall of such recess is preferably undercut as at 146 to provide a gutter for collecting and holding any particles of foreign material that might find their way to the bearing.

It is, of course, also desirable that the bearing between each connecting rod 28 and its wrist pin 30 also be sealed against the escape of lubricant therefrom and in Fig. 3 one construction is illustrated for accomplishing this result. As illustrated in this figure, plugs 148 are pressed into the piston 20 at the opposite ends of the wrist pin 30 to prevent the escape of lubricant along the pin 130 and out past its ends. Between the wrist pin bosses of the piston 20 and the side faces of the small end of the connecting rod 28, sealing members 149 are interposed to prevent the escape of lubricant at these points. Other bearings lubricated from the pump 68 may, of course, be similarly treated to prevent the escape of lubricant therefrom. One thing that may be noted at this point, however, is that in the construction illustrated in Figs. 1 to 5, inclusive, the main journals and crank pins always have the lubricant 88 from the reservoir 84 continuously circulated through them during operation of the engine and this not only provides ample lubrication for the cooperating bearings but, where employed in sufficient quantities, also serves to extract and dissipate heat from the bearings for these journals and which bearings are those most susceptible in the engine to destruction because of the heavy loads imposed thereon.

As previously suggested it is not always necessary that the oil be allowed to circulate through the passages 98 of the crankshaft and then be returned to the reservoir 84 through a return tube such as 104. Instead the oil may be introduced to the passages 98 and simply be maintained under a suitable pressure therein, relying in such case upon the splash of the oil 76 in the oil pan 16 over the exterior surfaces of the bearings for the crankshaft and connecting rods for extracting any undue amounts of heat occurring in these parts. The construction shown in Figs. 1 to 5, inclusive, may be readily modified to provide such system in the manner illustrated in Fig. 6 and in which it will be noted that the passages in the outer bearing shell for the righthand crankshaft journal 22 in Fig. 2, and the passage 102 in the corresponding bearing cap 38, have been omitted, so that while in such case lubricant is delivered to all of the crankshaft and connecting rod bearings there is no escape, other than through normal leakage, for the oil from the last crankshaft journal. Under such circumstances the lubricant delivered to the crankshaft and connecting rod bearings are simply retained by such bearings until it leaks therefrom. In this case the pump 68 is simply required to maintain a sufficient static head on the oil fed through the passage 98 to insure lubricating each bearing. Inasmuch as relatively small pressure will accomplish this result and inasmuch as very little leakage of lubricant from the connecting rod, crankshaft and bearings will occur under such circumstances if properly sealed, the pump 68 may be relatively small.

In either of the above cases it will be appreciated that the lubricant fed to the crankshaft and connecting rod bearings will never be contaminated by the lubricant fed to the cylinder walls. In the first described system the lubricant which is fed to the crankshaft and connecting rod bearings and is circulated through the crankshaft is never exposed to the lubricant which bathes the interior walls of the pistons and crankcase and consequently can never pick up the hard particles of foreign material from these surfaces which cause so much damage in conventional lubricating systems. In the second described system where no actual circulation of the lubricant to and from the reservoir 84 occurs, then new lubricant is being continuously fed to the crankshaft and connecting rod bearings and such bearings, therefore, receive and are lubricated by lubricant which has never previously been used. Furthermore, in both cases the lubricant fed to the crankshaft bearings is never exposed to the air or to other hot surfaces in the crankcase, unless and until it escapes from such bearings and become a part of the lubricant in the crankcase. While such lubricant for the crankshaft bearings remains in its own system, then the only air to which it is exposed is that in the reservoir 88, which is relatively cool, and in which neither the air nor the lubricant is so agitated as to promote oxidization of the lubricant. The evils of oxidization of such lubricant are therefore substantially entirely eliminated. The lubricant fed to the crankshaft and connecting rod bearings and which escapes into the interior of the crankcase 10 and oil pan 16 while, of course, lost from the system which supplies the crankshaft and connecting rod bearings with lubricant, is thereby not lost for use as it simply adds to the supply of oil 76 in the oil pan 16 which is employed for lubricating the cylinder walls. In fact, where the leakage of lubricant from such bearings is great enough and is of the same character as the oil 76, it may serve as a means for automatically replenishing the body of oil 76 in the oil pan 16, all new oil added to the engine being added to the reservoir 84 in such case. Thus, no wastage of oil will occur and assurance is had that the oil which is fed to the crankshaft and connecting rod bearings is clean and free of harmful particles of foreign material. Accordingly, it will be appreciated that the crankshaft and connecting rod bearings when furnished lubricant in accordance with the present invention will ordinarily last many times longer than those in conventional constructions.

One thing that should be noted as a result of the present invention is that the lubricant 88 in the reservoir 84 and which is delivered by the pump 68 to the crankshaft bearing may be a different type of lubricant from the lubricant 76. In other words the lubricants 76 and 88 may differ in certain characteristics as, for instance, in viscosity, flash point and in other respects. Thus in accordance with the present invention where different types of lubricant are best suited for the crankshaft bearings and for the cylinder walls, the proper type of lubricant may be furnished to each of these parts, each lubricant being best suited for the particular work to be performed by it, instead of providing a single lubricant as is conventionally employed which may be a compromise between those different lubricants which are best fitted for lubricating different parts of the engine.

In fact and under certain circumstances it is preferable to use a type of lubricant, for instance, for the crankshaft bearings which would be impossible for use as a cylinder wall lubricant. This particularly occurs where roller bearings, as in the case shown, are employed for the various crankshaft bearings and in which case, or at least in many instances, a lubricant of the solid or semi-solid type is best suited for such roller bearings. The present invention provides a means by which such solid or semi-solid lubricant may be fed to these roller bearings but in such case it will be appreciated that the ordinary type of oil pump such as the oil pump 68 illustrated in Figs. 1 and 2 and designed for handling liquid lubricant requires replacement by a different form of lubricant delivery apparatus for feeding the solid or semi-solid lubricant, and such construction is illustrated in Figs. 7 and 8.

In Figs. 6, 7 and 8 it may be assumed that the crankshaft is provided with the same series of lubricant passages as indicated in the previous figures with the exception that no return tube or duct such as 104 will be required. In other words, this part of the system will be the same as the second one described and employing the construction illustrated in Fig. 6. The form of apparatus illustrated in Figs. 6, 7 and 8 is one type that may be employed where a solid lubricant such as cup grease, or a semi-solid lubricant, may be employed for lubricating the bearings for the crankshaft and connecting rods. In this case a lubricant containing cylinder 150 may be mounted on the side of the engine which is indicated in Fig. 7 generally at 152 but which may be assumed to be of the identical construction of the engine shown in the preceding figure except for the differences herein stated. The cylinder 150 contains a mass of lubricant 154 therein and which is adapted to be pressed downwardly therein by means of a cooperating piston 156 slidably received within the cylinder 150. A coil spring 158 maintained under compression between the piston 156 and a cap or cover 160 for the cylinder 150 serves to maintain a pressure upon the lubricant 154 tending to discharge it from the cylinder. At its bottom end the cylinder 150 is formed to provide a second and smaller cylinder 162 the discharge end of which is connected by a tube 90', corresponding with the discharge tube 90 of the pump 68 in the previous construction, to the passage 92 in one of the end bearing caps 78 in the same manner as in the previously described construction. In the opposite end of the cylinder 162 a piston 164 is reciprocably received. A boss 166 formed integrally with the cylinder 162 projects upwardly into the lubricant 154 within the cylinder 150, and is provided with a spring pressed check valve 168 therein which permits the flow of the lubricant 154 from the cylinder 150 to the cylinder 162 but prevents flow in the opposite direction. The piston 164 may be connected by means of a link such as 170 with a foot pedal such as 172 accessible to the operator of the motor vehicle of which the engine 152 may form a part and a spring 174 cooperates with the pedal 172 to constantly urge it towards its inoperative position. It will be appreciated that depression of the pedal 172 will act to move the piston 164 inwardly of the cylinder 162, or to the right as viewed in Fig. 7, causing the lubricant which has been transferred into the cylinder 162 from the cylinder 150 to be compressed and to be discharged through the discharge pipe 90' to the crankshaft and thence through the passageway 98 thereof to the various bearings for the crankshaft and connecting rods. When the pressure of the operator's foot is relieved from the pedal 172 the spring 174 will return it to its inoperative position and in returning it will withdraw the piston 164 outwardly of the cylinder 162, causing a suction to be built up within the cylinder 162 which with the pressure of the spring 158 on the piston 156 will force lubricant 154 from the cylinder 150 down past the check valve 168 into the cylinder 162 to replace that which was discharged upon the previous stroke of the pedal 172. When the system illustrated in Figs. 6, 7 and 8 is employed it will, of course, be necessary to actuate the pedal 172 to discharge the lubricant to the bearings of the crankshaft at relatively infrequent intervals inasmuch as such lubricant is sealed against escape from the crankshaft and because of its character will last a relatively long time. The lubricant which is employed in the oil pan 16 for lubricating the cylinder bores will, of course, be of substantially the same character as that previously described inasmuch as its function and characteristics will remain the same regardless of the character of the lubricant employed for the crankshaft.

Having thus described my invention what I claim by Letters Patent is:

1. In combination with an internal combustion engine having a crankcase and a cylinder wall exposed to the interior thereof, and a crankshaft bearing, means for applying to and collecting lubricant draining from said cylinder wall and from the interior walls of said crankcase and re-delivering said lubricant to said cylinder wall, and means independent of the first-mentioned means for delivering lubricant to said bearing, the lubricant in the last mentioned means being sealed from contamination by lubricant in the first mentioned means.

2. In combination with an internal combustion engine having a cylinder wall and a crankshaft bearing, a pair of lubricant reservoirs, means for delivering lubricant from one of said reservoirs to said cylinder wall, other means independent of said one of said reservoirs for delivering lubricant from the other of said reservoirs to said bearing, and means for collecting lubricant draining from said cylinder wall and delivering it to the first-mentioned means for re-delivery to said cylinder wall.

3. In combination with an internal combustion engine having a cylinder wall and a crankshaft bearing, a lubricant container arranged to receive lubricant drained from said cylinder wall, pumping means driven from said engine for delivering lubricant in said container to said cylinder wall, a second lubricant container sealed against contamination by lubricant from the first-mentioned container, and means operable to deliver lubricant from said second container to said bearing independently of lubricant from said first-mentioned container.

4. In combination with an internal combustion engine having a cylinder wall and a crankshaft bearing, a first lubricant circulatory system including a lubricant container adapted to receive lubricant draining from said cylinder wall, a pumping means, and said cylinder wall; a second lubricant circulatory system independent of the first mentioned lubricant circulatory system including a second lubricant container, a pumping means and said bearing; and means for driving both of said pumping means from said engine.

5. In combination with an internal combustion engine having a cylinder wall and a crankshaft bearing, two sources of lubricant supply, the lubricant in one of said sources having different characteristics from the lubricant in the other of said sources, means for applying to said cylinder wall and draining lubricant from said cylinder wall into one of said sources and redelivering said lubricant from said one of said sources to said cylinder wall, and other means independent of said one of said sources for delivering lubricant from the other of said sources to said bearing.

6. In an internal combustion engine of the class having a cylinder wall, a crankshaft having a lubricant passage extending therethrough, bearings supporting said crankshaft and said crankshaft having passages communicating said lubricant passage therein with said bearings, the combination with said cylinder wall, crankcase and bearing of a first lubricant container arranged to receive lubricant discharged from said cylinder wall, pumping means driven from said engine for withdrawing the lubricant from said first lubricant container and delivering it to said cylinder wall, a second lubricant container independent of the first-mentioned container, pumping means driven from said engine for delivering lubricant from said second container to said lubricant passage in said crankshaft, and means for returning lubricant delivered to said passage in said crankshaft to said second container.

7. In combination with an internal combustion engine having a cylinder wall, a crankshaft having a lubricant passage extending therethrough, bearings supporting said crankshaft and said crankshaft having passages communicating said lubricant passage therein with said bearings, a lubricant container adapted to receive lubricant draining from said cylinder wall, pumping means; said container, pumping means and cylinder wall being arranged in a common lubricant circulatory system; and means independent of said system for delivering lubricant to said passage in said crankshaft and to said bearings for said crankshaft.

8. In combination with an internal combustion engine having a cylinder wall, a crankshaft bearing, and an oil pan arranged to receive lubricant draining from said cylinder wall, pumping means operated by said engine for withdrawing lubricant from said oil pan and delivering it to said cylinder wall to the exclusion of said bearing, a source of lubricant independent of said oil pan, and pumping means independent of the first-mentioned pumping means for delivering lubricant from said source to said bearing, and means sealing said bearing against the escape of lubricant therefrom to said oil pan.

9. In combination with an internal combustion engine having a cylinder wall, a crankshaft having a lubricant passage extending therethrough, bearings supporting said crankshaft and said crankshaft having passages communicating said lubricant passage therein with said bearings, the combination of a first lubricant container arranged to receive lubricant discharged from said cylinder wall, pumping means driven from said engine for withdrawing the lubricant from said first lubricant container and delivering it to said cylinder wall to the exclusion of said bearings for said crankshaft, a second lubricant container independent of said first-mentioned lubricant container, pumping means driven from said engine for delivering lubricant from said second container to said lubricant passage in said crankshaft, and means for returning lubricant delivered to said passage in said crankshaft to said second container.

JULIUS DUSEVOIR.